(12) United States Patent
Kimura et al.

(10) Patent No.: US 6,459,699 B1
(45) Date of Patent: Oct. 1, 2002

(54) ATM SWITCHING MODULE WHICH ALLOWS SYSTEM GROWTH WITH DIFFERENT TYPE OF MODULE WITHOUT CELL-LOSS DURING CUTOVER

(75) Inventors: Toshiharu Kimura, Fukuoka; Tetsuro Maeda, Tokyo, both of (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/316,114

(22) Filed: May 20, 1999

(30) Foreign Application Priority Data

May 20, 1998 (JP) .......................................... 10-139046

(51) Int. Cl.⁷ .............................................. H04L 12/56
(52) U.S. Cl. .................. 370/396; 370/392; 370/395.31; 370/398; 370/905; 359/128
(58) Field of Search .............................. 370/238.1, 356, 370/358, 360, 367, 372, 386, 388, 389, 392, 395.1, 396, 395.3, 395.31, 395.5, 395.51, 395.61, 400, 401, 402, 474, 902, 905; 359/128, 138, 139, 164, 165

(56) References Cited

U.S. PATENT DOCUMENTS

| 5,555,243 A | | 9/1996 | Kakuma et al. ........... 370/58.2 |
| 6,078,585 A | * | 6/2000 | Kakuma et al. |
| 6,236,655 B1 | * | 5/2001 | Caldera et al. |

FOREIGN PATENT DOCUMENTS

| EP | 0 785 698 | 7/1997 |
| JP | 4-273739 | 9/1992 |
| JP | 5-167603 | 7/1993 |
| JP | 5-308687 | 11/1993 |
| JP | 6-141038 | 5/1994 |
| JP | 7-115421 | 5/1995 |
| JP | 7-143135 | 6/1995 |
| JP | 7-327036 | 12/1995 |
| WO | 95/30318 | 11/1995 |

OTHER PUBLICATIONS

Fischer et al., "A Scalable ATM Switching System Architecture" IEEE Journal on Selected Areas in Communications, vol. 9, No. 8, (1991), pp 1299–1307.

* cited by examiner

Primary Examiner—William Luther
(74) Attorney, Agent, or Firm—Foley & Lardner

(57) ABSTRACT

In an ATM switching module, expansion interfaces are connected in pair to an ATM switch to respectively operate in active and standby states. When another ATM switching module is installed and a connection is established between an expansion interface of standby state and the newly installed ATM switching module, a process sets the standby state expansion interface in hot-standby state, and holds off incoming ATM cells destined for the hot-standby state expansion interface until the connection is ready to accept cell traffic, whereupon the hot-standby state expansion interface is switched to active state, whereby the ATM switch and an ATM switch of the another switching module constitute a multi-stage configuration. The processor is arranged to update the routing table according to internal state of the ATM switch so that, when a call is to be established for an incoming ATM cell, the header of the cell contains a plurality of fields containing routing data respectively associated with different stages of the multi-stage configuration.

7 Claims, 5 Drawing Sheets

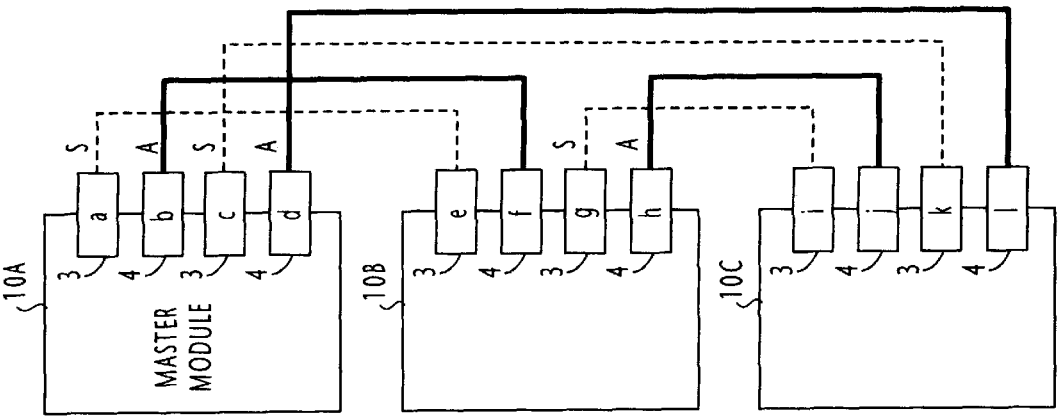
FIG. 2D
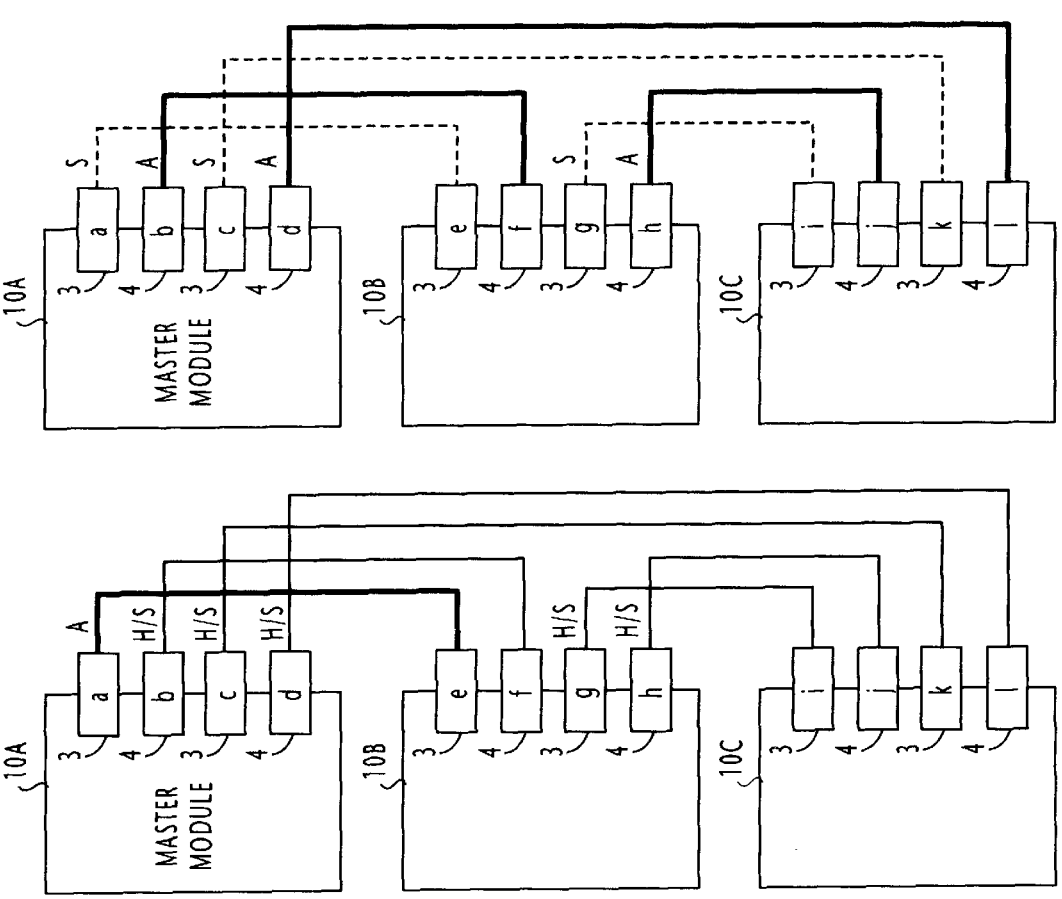
FIG. 2C
FIG. 2B
MANUAL CABLE LAYING
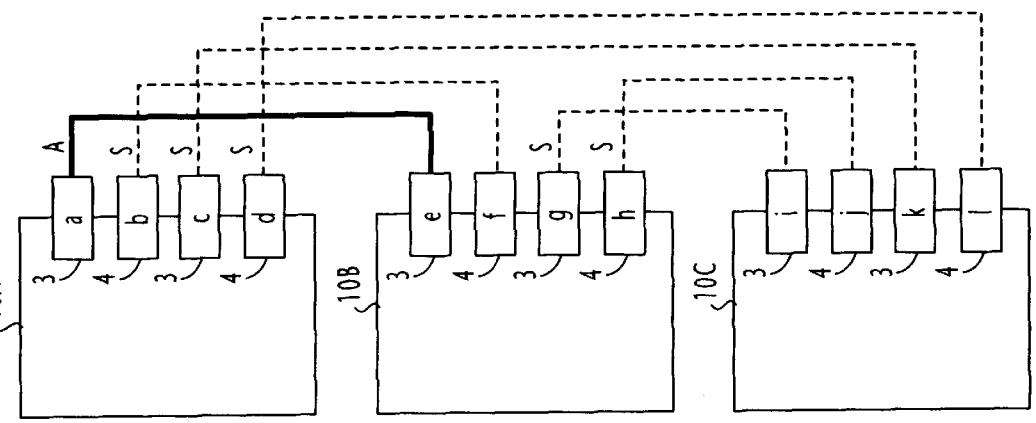
FIG. 2A
EXISTING SYSTEM
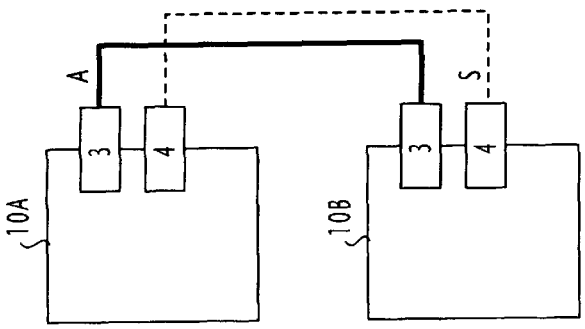
LEGEND:
A.: ACTIVE
S: STANDBY
H/S: HOT STANDBY

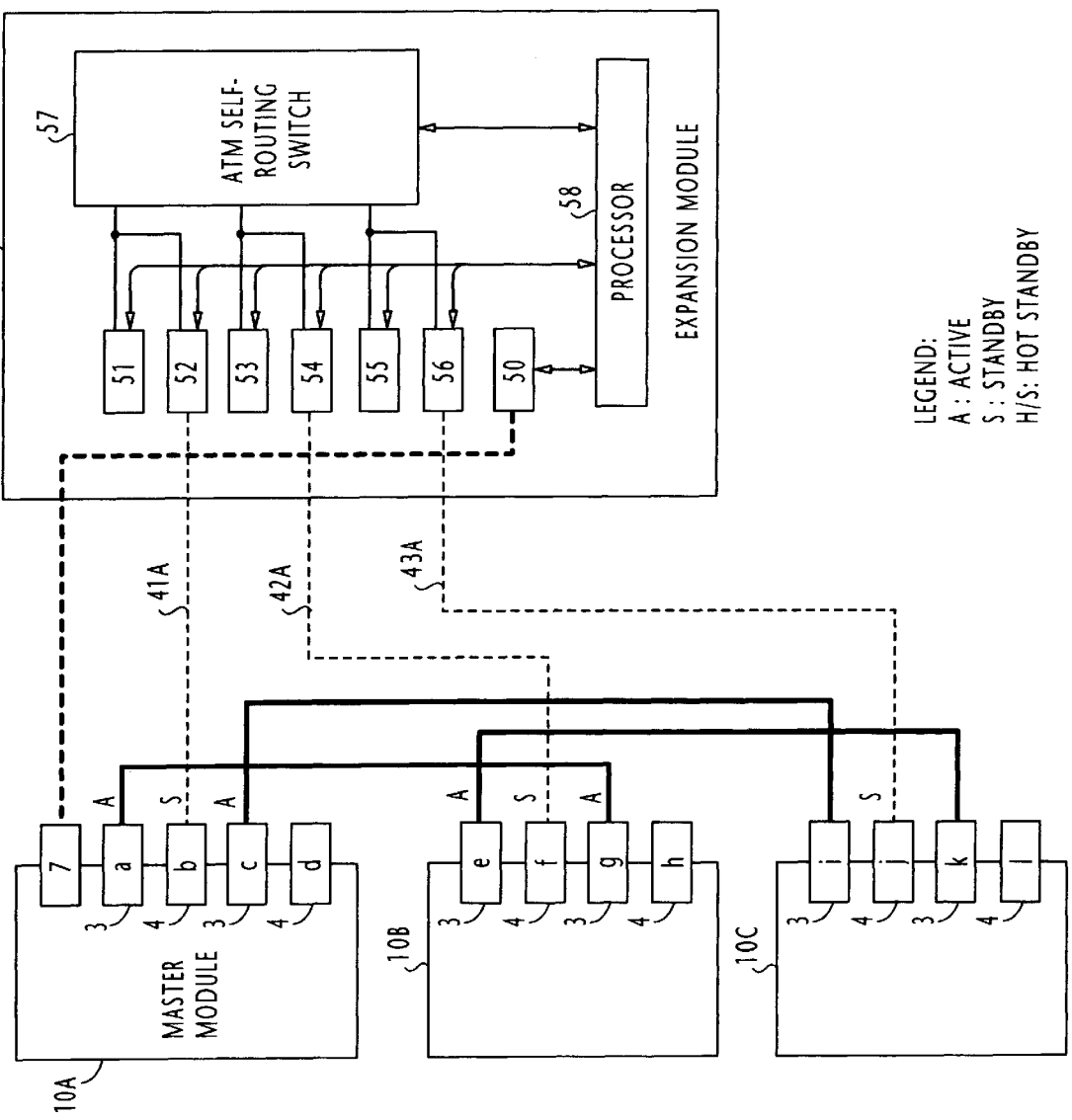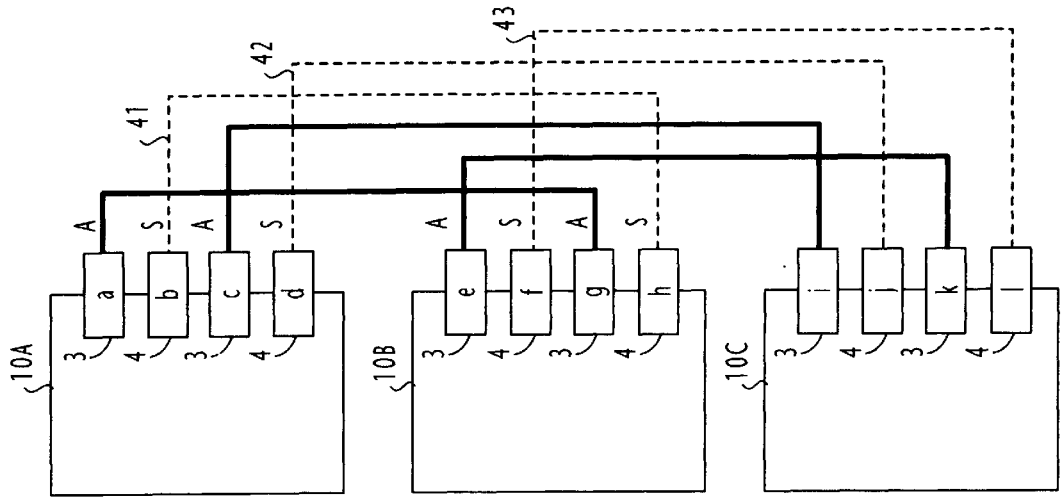

FIG. 4E MANUAL CABLE LAYING

ATM SWITCHING MODULE WHICH ALLOWS SYSTEM GROWTH WITH DIFFERENT TYPE OF MODULE WITHOUT CELL-LOSS DURING CUTOVER

BACKGROUND OF THE INVENTION

1. Field of the Invention

The present invention relates generally to ATM (asynchronous transfer mode) switching technology, and more specifically to system expansion using ATM switching modules of different types without losing cells during cutover.

2. Description of the Related Art

ATM switches have been developed for high speed network applications such as broadband ISDN. For ease of system expansion, an ATM switch is usually constructed of N×N configuration to be used as a basic building block to implement a switching system of desired size. To ensure non-blocking operation during system expansion, N/2 ports of the switch are preassigned to expansion switching modules. Since the preassigned ports are normally reserved as idle ports, utilization efficiency of the input ports of a switch is low for applications if the number of subscribers is smaller than N2. This is particularly true when the operating speed of subscriber is low. In some cases, subscriber's per-port usage is much lower than the processing capacity of the switch. if this fact is taken into account with the link capacity of expansion interfaces, non-blocking operation can still be realized with switches whose preassigned ports for expansion are smaller than N/2, particularly in switching nodes at the edge of a public switched telephone network. This prior art technique is described in Japanese Laid-Open Patent Specifications Hei-4-273739 and Hei-7-115421.

In addition, two approaches are currently available for system expansion, one involving the use of a number of identical basic switching modules, while the other using a large-sized switching module as an intermediate stage. In these techniques, precautions are taken against losing cells during cutover of the expansion units. However, it is impossible to incorporate the large-sized switching module in an expansion process in which the basic switching modules are exclusively used without causing cell loss, since the fixed number of preassigned ports allows no freedom to flexibility in combining different types of switching modules.

SUMMARY OF THE INVENTION

It is therefore an object of the present invention to provide an ATM switching module that can be used with a different type of switching module during system expansion without causing cell loss.

According to a first aspect of the present invention, there is provided an ATM switching module comprising a plurality of line interfaces, each line interface having a routing table for receiving an ATM cell, making a search through the routing table for routing data according to a connection identifier contained in the cell, and updating header of the cell according to the routing data. An ATM switch is provided for routing the ATM cell according to the updated header. A plurality of pairs of expansion interfaces are provided such that the expansion interfaces of each pair being connected together to the ATM switch to operate in active and standby states, respectively. A processor is responsive to another ATM switching module being installed and a connection being established between one of the expansion interfaces of standby state and the Installed ATM switching module, for setting the standby state expansion interface in hot-standby state, holding off incoming ATM cells destined for the hot-standby state expansion interface until the connection is ready to accept cell traffic, and switching the hot-standby state expansion interface to active state, whereby the ATM switch and an ATM switch of the newly installed switching module constitute a multi-stage configuration. The processor is further arranged to update the routing table according to internal state of the ATM switch so that, when a call is to be established for an incoming ATM cell, the header of the cell contains a plurality of fields containing routing data respectively associated with different stages of the multi-stage configuration.

According to a second aspect, the present invention provides a method for expanding a communications network, wherein the network comprises a plurality of ATM switching modules, each of the modules comprising a plurality of line interfaces, each line interface having a routing table for receiving an ATM cell, making a search through the routing table for routing data according to a connection identifier contained in the cell, and updating header of the cell according to the routing data, an ATM switch for routing the ATM cell according to the updated header, a plurality of pairs of expansion interfaces, the expansion interfaces of each pair being connected together to the ATM switch and operating in active and standby states, respectively. The method comprises the steps of (a) Installing an ATM switching module as an additional unit, (b) establishing a connection between one of the expansion interfaces of standby state and the installed ATM switching module, (c) setting the standby state expansion interface to hot-standby state and holding off incoming ATM cells destined for the hot-standby state expansion interface until the connection is ready to accept cell traffic, (d) switching the hot-standby state expansion interface to active state, whereby the ATM switch and an ATM switch of the another switching module constitute a multi-stage configuration; and (e) responsive to an incoming ATM cell, updating the routing table according to internal state of said ATM switch so that the header of the cell contains a plurality of fields containing routing data respectively associated with different stages of the multi-stage configuration.

BRIEF DESCRIPTION OF THE DRAWINGS

The present invention will be described in further detail with reference to the accompanying drawings, in which:

FIGS. 2A to 2D are schematic block diagrams of a system configuration when the system undergoes successive stages of expansion according to a first embodiment of the present invention;

FIGS. 4A to 4E are schematic block diagrams of a system configuration when the system undergoes successive stages of expansion according to a second embodiment of the present invention.

DETAILED DESCRIPTION

Figure 1:
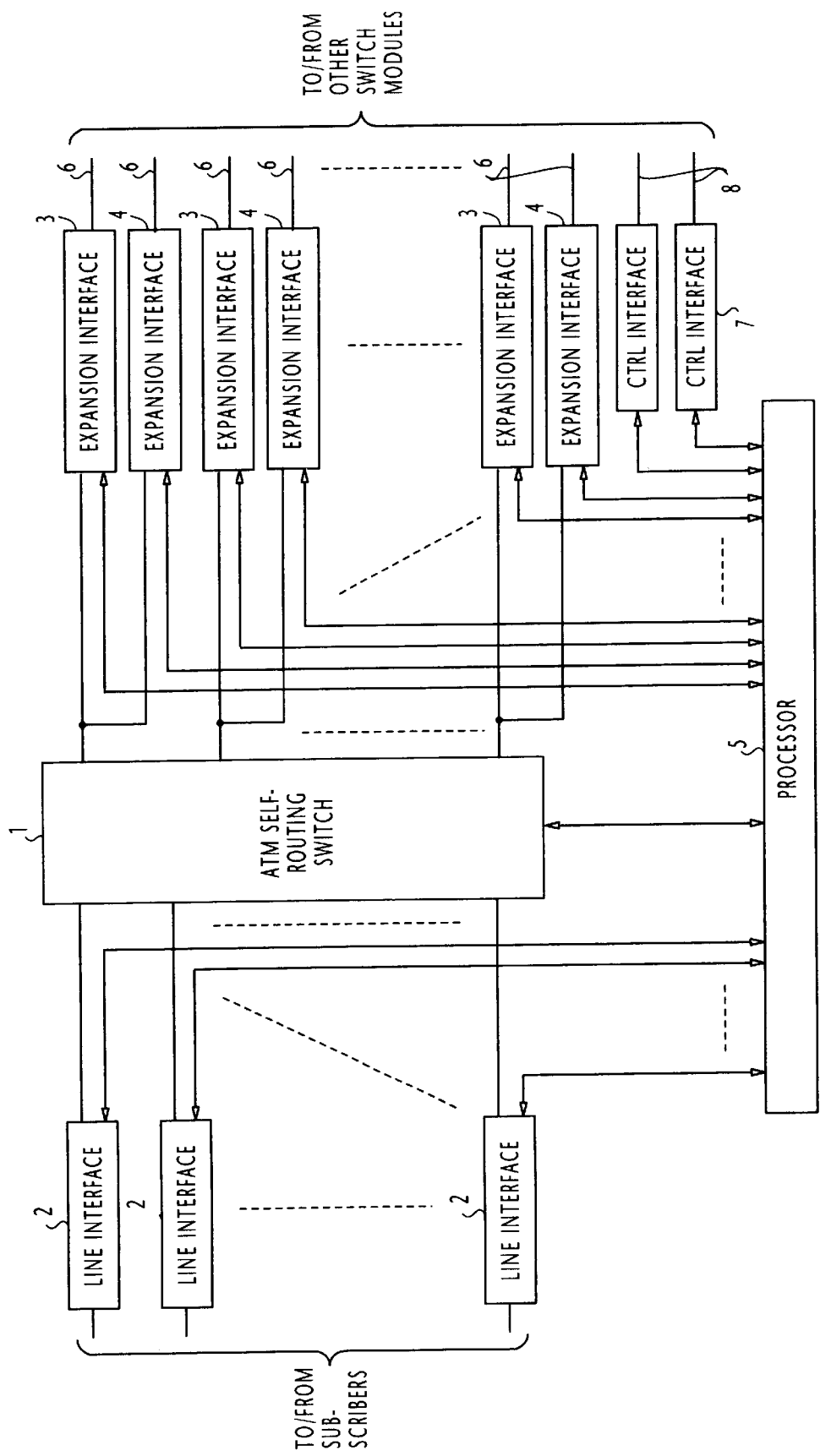
FIG. 1 is a block diagram of an ATM basic switching module according to the present invention.

In FIG. 1, there is shown an ATM switch module according to the present invention. This switch module is used as a basic building block to construct a multistage ATM switching system, in which one of the switching modules functions as a master switching module when a new switching module is installed.

The basic building block comprises an ATM self-routing switch 1, a plurality of line interfaces 2, and a plurality of pairs of expansion interfaces 3, 4. A processor 5 receives signals from the line interfaces 2 and expansion interfaces 3, 4 and has access to the internal status of switch 1.

Each line interface 2 has a routing table whose contents are updated by the processor 5 according to the internal states of the switch 1. When the line interface 2 receives an ATM cell from associated subscriber terminal, it reads its VPI/VCI (virtual path identifier/virtual channel identifier) of the cell header and makes a search through its routing table for information necessary for routing the received cell and updates the VPI/VCI values according to the routing information. This ATM cell is launched into the self-routing switch 1 where it is self-routed to a desired output port according to the routing information contained in the cell. Each line interface 2 further includes a buffer for putting incoming cells in a queue when a backpressure signal is received.

Expansion interfaces 3 and 4 are connected together to the switch 1 to form a pair of active and standby units, while they are respectively connected to corresponding expansion interfaces of other basic switch module via cable links 6. When a cable link is switched to an active state during a module expansion phase, the expansion interface is arranged to transmit a backpressure signal toward a call request source in response to a backpressure-set command signal from the master switch module and clears the backpressure signal when a backpressure disconnect command is received from the master switch module. The purpose of the backpressure signal is to hold incoming ATM cells in the queuing buffer until a new route is established during the module expansion phase in order to prevent them from being corrupted or lost by switchover operation.

To add flexibility to the ATM switching module, universal slots are provided for mounting the line interfaces 2 and the expansion interfaces 3, 4. Although these interfaces have different number of input and output terminals and circuit functions, the universal slots have different sets of terminals respectively adapted for the interfaces 2 and the interfaces 3, 4. When they are inserted to the universal slots, they are connected to the appropriate terminals.

The capacity of an ATM switching system can be expanded by installing a new switching module and adding expansion interfaces to the existing modules. Connecting cables are laid down between the new expansion interfaces of the existing modules and all expansion interfaces of the new switching module.

Once the existing and new switching modules are wired together, the processor 5 of the master module takes the responsibility to perform a "cutover" of all the new expansion Interfaces in order to place them into service according to the system configuration of active/standby maintenance plan.

For this cutover operation, control interfaces 7 are connected to the processor 5 of the master switching module to exchange control messages with other switching modules via control links 8.

FIGS. 2A to 2D illustrate a series of phases involved when a new switching module is installed in a two-unit ATM switching system as shown in FIG. 2A.

In FIG. 2A, it is shown that switching modules, 10A and 10B are interconnected by an active link indicated by a thick line "A" terminating at both ends to active interfaces 3 and by a standby link indicated by a dotted line "S" terminating at both ends to standby interfaces 4. In this system configuration, ATM cells transported across two switching modules are routed according to three physical addresses inserted respectively to PA0, PA1 and PA2 fields of their cell header.

For a given two-stage connection, the physical address of a cell in the PA0 field indicates an outgoing line port of the switching module to which the cell is directed, the physical address of the cell in the PA1 field indicates routing information used by the second stage of the connection, and the physical address of the cell in the PA2 field indicates routing information used by the first stage of the connection. These routing information of an ATM cell are set according to the routing table of a line interface where its cell header is updated.

If the connection involves only one switching stage (i.e., intra-module call), the PA0 field contains no data, the PA1 field contains data indicating an outgoing line port and the PA2 field contains routing data to be used by the local ATM switch.

In FIG. 2B, a new switching module 10C is installed and new expansion interfaces are installed in the existing modules 10A and 10B. As a result, the system has expansion interfaces indicated by letters "a" to "I", with the interfaces "a" and "e" being interconnected by existing active link "A" and interfaces "b" and "f" being interconnected by existing standby link "S". Cables are laid as standby links "S" between interfaces "c" and "k", "d" and "I", "g" and "I", and "h" and "j".

In FIG. 2C, the switching module 10A functions as a master module and its processor takes the responsibility to perform a cutover operation.

Figure 3:
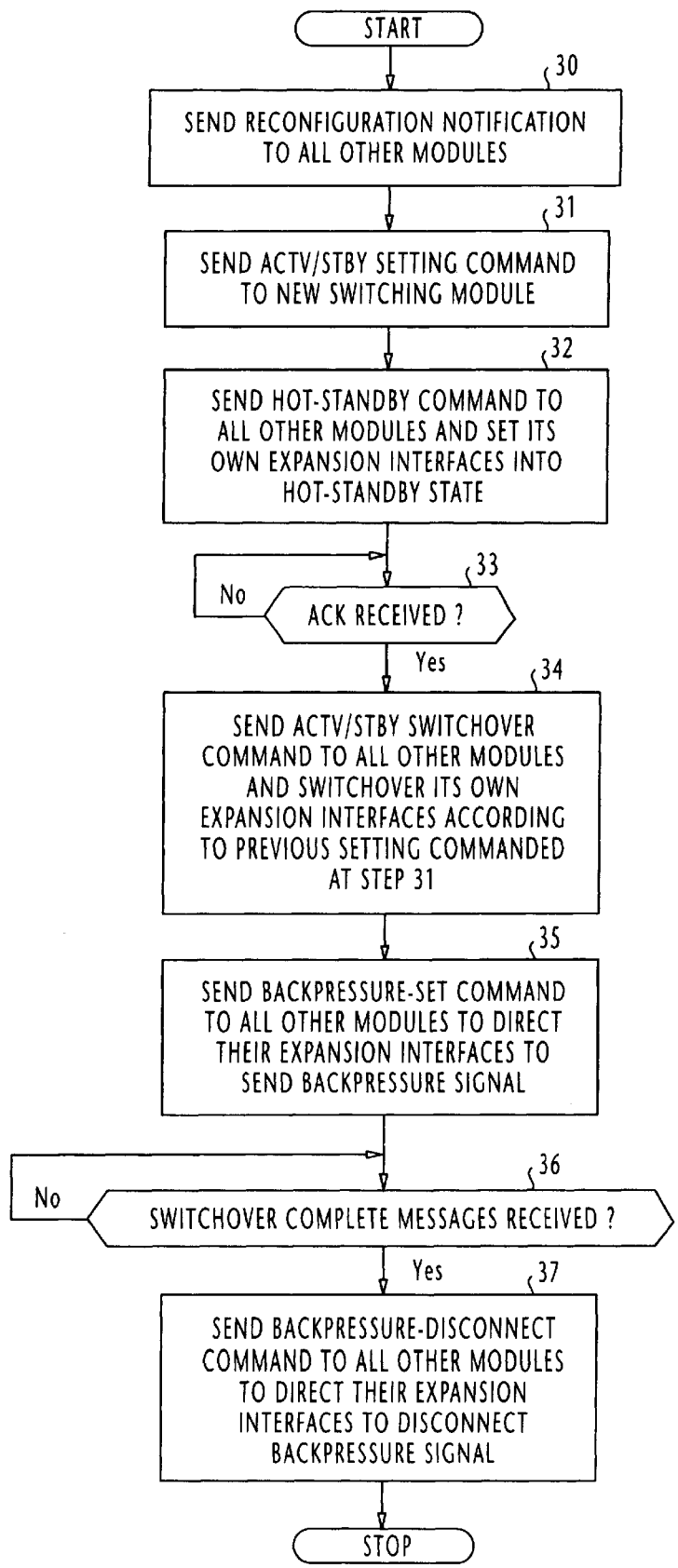
FIG. 3 is a flowchart of the operation of a master processor when the system undergoes expansion according to the present invention.

The cutover operation of the processor 5 at the master module proceeds according to the flowchart of FIG. 3.

A cutover operation begins with step 30 where the master processor transmits a reconfiguration notification to modules 10B and 10C. At step 31, the master processor sends an active/standby setting command from module IOA to new switching module 10C. This command message indicates the links to be set "active" or "standby" according to the system's maintenance plan. At step 32, the processor sends a "hot-standby" command to modules 10B and 10A and proceeds to set its own expansion interfaces "b", "c", "d" in a hot-standby state. In response, the processor at module 10B sets its interfaces "f", "g", "h" in a hot-standby state and the processor at module 10C sets all of Its expansion interfaces in a hot-standby state. The hot-standby state of an expansion interface is one in which the internal state of the Interface is active and ready to accept ATM cells, but no connection is established from the ATM switch 1, while the active state is one in which the expansion interface is accepting flow of ATM traffic from the ATM switch 1 for processing.

In this way, all links set to the standby state in FIG. 2B are set to the hot-standby state as indicated by solid lines in FIG. 2C Note that the ATM traffic carried by the active link "A" between expansion interfaces "a" and "e" is not affected during this operation.

When the hot-standby setting operation is completed at a modules 10B and 10C, their processor returns an acknowledgment message to the master module 10A. The processor at master module responds to the acknowledgment messages at step 33 and proceeds to step 34 to send an active/standby switchover command to modules 10B and 10C and sets its own expansion interfaces according to the active/standby command message previously sent. The purpose of this switchover command message is to switchover all the expansion interfaces according to the active/standby setting previously commanded at step 31. In response to this switchover command message, switchover operation proceeds in each of the switching modules.

Following the transmission of the switchover command message, the processor at master module (or master processor) proceeds from step 34 to step 35 to send a backpressure-set command message to modules 10B and 10C in order to direct their extension Interfaces, which are in the process of being switched over to active state, to apply a backpressure signal to their input port. "Backpressure" is used in the ATM switching technology when it is desired to exert a backward pressure on incoming traffic to prevent it from entering the ATM switch so that the switch is prevented from being overloaded.

As a result, if a connection is established from a line interface through the associated ATM switch 1 to one of these extension interfaces, the backpressure signal of that interface will be transmitted to the line interface and the incoming ATM cells will be stored in the buffer of that line interface. This hold-off condition continues until the connection established by the hot-standby expansion interfaces and their associated link are completely switched over to active state and ready to accept incoming traffic.

When the switchover setting operation is completed at modules 10B and 10C, their processor returns a switchover complete message to the master module 10A. The master processor responds to the returning switchover complete messages at step 36 and proceeds to step 37 to send a backpressure-disconnect command to modules 10B and 10C to direct their switched active interfaces to disconnect the backpressure signal. The hold-off condition is released and the switched-over active expansion interfaces and their associated links accept traffic. In this manner, ATM cells within the ATM switch 1 are not corrupted or lost when the hot-standby links are switched over to active state.

When the hot-standby links are finally switched over to the active and standby states which were set in the system according to the command message of step 31, the link states of the system will be reconfigured as shown in FIG. 2D. In this configuration, the expansion interfaces "b" and "d" are connected by active links to interfaces "f" and "I", and expansion interface "h" is connected by an active link to interface "j", and other expansion interfaces are set in standby state.

A second embodiment of the present invention is shown in FIGS. 4A through 4E. In the second embodiment, three existing basic switching modules 10A, 10B and 10C are interconnected to form a multistage network as shown in rig. 4A in which links 41, 42, 43 are in standby state, Interconnecting expansion interfaces "b" and "f", "d" and "j", and "f" and "I".

According to this modification, a large-sized expansion switching module 11 is used for interconnecting the existing modules as illustrated in FIG. 4B. Expansion switching module 11 comprises a control interface 50, a plurality of expansion interfaces 51 through 56, an ATM switch 57 and a processor 58 whose function is similar to the processor of modules 10B and 10C. Control interface 50 is connected by an active link to the control interface 7 of the master module 10A. During the initial phase of expansion, standby links are manually established by rewiring the existing standby links 41, 42 and 43 to the interfaces 52, 54 and 56 as new standby links 41A, 42A and 43A.

Figure 4D:
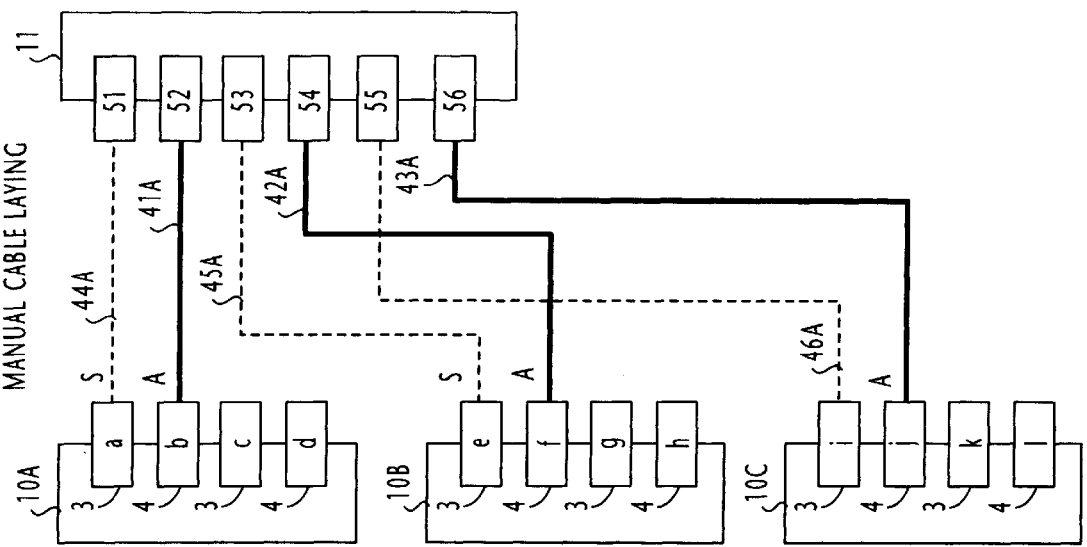
Figure 4D:
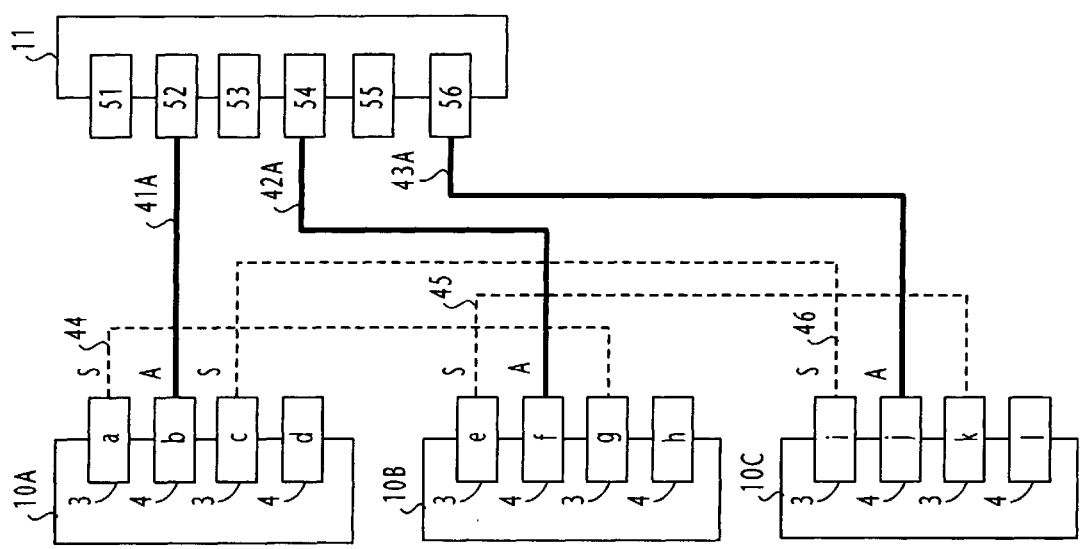
Figure 4C:
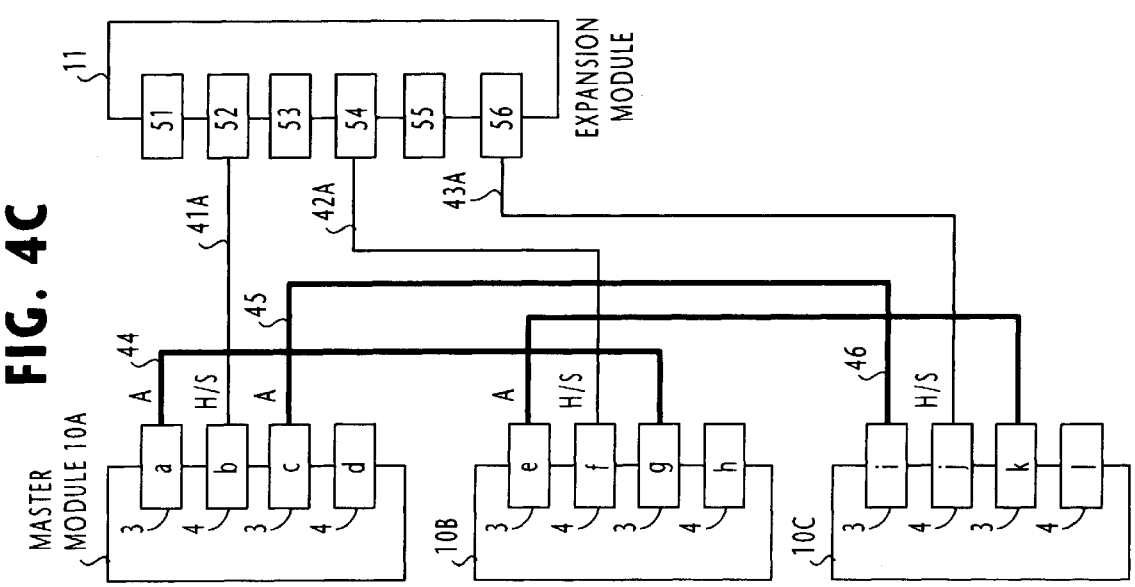

In FIG. 4C, a cutover operation of the laid-down standby links is initiated by the master processor according to the flowchart of FIG. 3.

In FIG. 3, the master processor sends a system reconfiguration notification to all other switching modules including the expansion module 11 (step 30). At step 31, the master processor sends an active/standby setting command to the expansion switching module 11. This command message indicates the links to be set "active" or "standby" according to the system's maintenance plan. At step 32, the processor sends a "hot-standby" command to modules 10B, 10A and 11, and proceeds to set its own expansion interface "b" in hot-standby state. In response to this command, expansion interfaces "f" and "j" are set in a hot-standby state and corresponding interfaces 52, 54 and 56 of expansion module 11 are set in hot-standby mode.

When the hot-standby setting operation is completed at modules 10B, 10C, 11, their processor returns an acknowledgment message to the master module IOA. The master processor responds to the acknowledgment messages at step 33 and proceeds to step 34 to send an active/standby switchover command to modules 10B, 10C and 11, and sets Its own expansion interfaces according to the active/standby command message previously sent. The purpose of this switchover command message is to switchover all the expansion interfaces according to the active/standby setting previously commanded at step 31. In response to this switchover command message, switchover operation proceeds in each of the switching modules.

Following the transmission of the switchover command message, the processor at master module proceeds from step 34 to step 35 to send a backpressure-set command message to modules 10B, 10C, 11 In order to direct their extension interfaces to apply a backpressure signal to their input port. As a result, when a connection is established from a line interface through the associated ATM switch 1 to one of these extension interfaces, the backpressure signal of that interface will be transmitted to the source and the incoming ATM cells will be stored in the buffer of that line interface. This hold-off condition continues until the new active line interfaces and their associated link are ready to accept incoming traffic.

When the switchover setting operation is completed at modules 10B, 10C, 11, their processor returns a switchover complete message to the master module 10A. The master processor responds to the returning switchover complete messages at step 36 and proceeds to step 37 to send a backpressure-disconnect command to modules 10B, 10C, 11 to direct their switched active interfaces to disconnect the backpressure signal. The hold-off condition is released and the switched-over active expansion interfaces and their associated links accept incoming traffic.

When the hot-standby links are finally switched over to the active and standby states which were set in the system according to the command message of step 31, the link states of the system will be reconfigured as shown in FIG. 4D, In which inter-module ATM cells are transported by expansion Interfaces "b", "f", "j", 52, 54 and 56.

FIG. 4E shows the final stage of the system expansion. In this stage, standby links 44, 45 and 46 are manually rewired and new standby links 44A, 45A and 46A are established to expansion units 51, 53 and 55 of the expansion module. Therefore, all inter-module calls are routed through the expansion module 11.

For a given three-stage connection, the physical address of a cell in the PA0 field indicates routing information to be used by the third stage of the connection, the physical address of the cell in the PA1 field indicates routing information to be used by the first stage of the connection, and the physical address of the cell in the PA2 field indicates routing information to be used by the second stage of the connection, i.e., the expansion module 11.

What is claimed is:

1. An ATM switching module comprising:
   a plurality of line interfaces, each line interface having a routing table for receiving an ATM cell, making a search through the routing table for routing data according to a connection identifier contained in the cell, and updating header of said cell according to the routing data;
   an ATM switch for routing said ATM cell according to said updated header;
   a plurality of pairs of expansion interfaces, the expansion interfaces of each pair being connected together to said ATM switch and operating in active and standby states, respectively; and
   a processor, responsive to another ATM switching module being installed and a connection being established between one of said expansion interfaces of standby state and said another ATM switching module, for setting said standby state expansion interface to hot-standby state, holding off incoming ATM cells destined for said hot-standby state expansion interface until said connection is ready to accept cell traffic, and switching the hot-standby state expansion interface to active state, whereby said ATM switch and an ATM switch of said another switching module constitute a multistage configuration,
   said processor updating said routing table according to internal state of said ATM switch so that, when a call is to be established for an incoming ATM cell, the header of the cell contains a plurality of fields containing routing data respectively associated with different stages of said multi-stage configuration.

2. The switching module of claim 1, wherein said processor is arranged to cause said hot-standby expansion interface to transmit a backpressure signal until said connection is ready to accept cell traffic.

3. The switching module of claim 1, further comprising a plurality of universal slots, and wherein said line interfaces and said expansion interfaces are arranged to be inserted to said universal slots.

4. The switching module of claim 1, wherein said another ATM switching module constitutes a local stage of said multi-stage configuration.

5. The switching module of claim 1, wherein said another ATM switching module constitutes an intermediate stage of said multi-stage configuration.

6. A method for expanding a communications network, wherein the network comprises a plurality of ATM switching modules, each of the modules comprising:
   a plurality of line interfaces, each line interface having a routing table for receiving an ATM cell, making a search through the routing table for routing data according to a connection identifier contained in the cell, and updating header of said cell according to the routing data;
   an ATM switch for routing said ATM cell according to said updated header;
   a plurality of pairs of expansion interfaces, the expansion interfaces of each pair being connected together to said ATM switch and operating in active and standby states, respectively, the method comprising the steps of:
   a) installing an ATM switching module as an additional unit;
   b) establishing a connection between one of said expansion interfaces of standby state and said installed ATM switching moduls;
   c) setting said standby state expansion interface to hot-standby state and holding off incoming ATM cells destined for said hot-standby state expansion interface until said connection is ready to accept cell traffic;
   d) switching the hot-standby state expansion interface to active state, whereby said ATM switch and an ATM switch of said another switching module constitute a multi-stage configuration; and
   e) responsive to an incoming ATM cell, updating said routing table according to internal state of said ATM switch so that the header of the cell contains a plurality of fields containing routing data respectively associated with different stages of said multi-stage configuration.

7. The method of claim 6, wherein the step (c) comprises transmitting a backpressure signal from said hot-standby expansion interface to one of said line interfaces until said connection is ready to accept cell traffic.

* * * * *